United States Patent [19]

Schofield

[11] Patent Number: 5,587,219

[45] Date of Patent: Dec. 24, 1996

[54] NECK CUSHIONING TOWEL

[76] Inventor: Lois E. Schofield, 27 Wildwood La., So. Hadley, Mass. 01075

[21] Appl. No.: 646,732

[22] Filed: May 1, 1996

Related U.S. Application Data

[63] Continuation of Ser. No. 382,082, Feb. 1, 1995, abandoned.

[51] Int. Cl.⁶ .............................. B32B 3/08; B32B 3/06
[52] U.S. Cl. .............................. 428/68; 428/99; 428/100; 5/419; 5/420
[58] Field of Search .............................. 428/76, 99, 68, 428/78, 100; 5/417, 419, 420

[56] References Cited

U.S. PATENT DOCUMENTS

| | | | |
|---|---|---|---|
| 4,195,378 | 4/1980 | Parker | 5/419 |
| 4,231,125 | 11/1980 | Tittl | 5/419 |
| 4,546,507 | 10/1985 | Weinstein | 5/419 |
| 5,388,295 | 2/1995 | Sarkozi | 5/420 |

*Primary Examiner*—Alexander Thomas

[57] ABSTRACT

A rectangular neck cushioning towel utilizing an insertable gel-filled vinyl sac for providing comfort and lending support for the head during hair care procedures done at a commercial sink. Centered along the top edge of the towel is a velvety soft pouch for holding the cushioning sac. The sac is held in place by means of a hook and pile fastener. The neck cushioning towel incorporates features for adjustable fit and color coordination.

7 Claims, 2 Drawing Sheets

NECK CUSHIONING TOWEL

This is a continuation of application Ser. No. 08/382,082, filed 1995 February 1 now abandoned.

BACKGROUND

1. Field of Invention

This invention relates to a neck cushioning towel, specifically one that is worn at a sink in a beauty salon, barber shop or the like to provide comfort and to help maintain the head in a neutral position while the hair is being washed, rinsed or treated.

2. Description of Prior Art

Beauty salons, barber shops or the like commonly supply a customer with a clean, ordinary, terry cloth towel, which is used mainly for the absorption of water or chemicals as the hair is washed, rinsed or treated. Ordinarily, the sink used for these purposes is made of a hard material—cast iron, molded plastic or porcelain over steel. The sink is generally designed with an uncushioned indentation where the cervical vertebral area of the neck rests. There being no support for the head, the head often tilts backward over the inner edge of the indentation, causing hyperextension or distortion of the vertebral arteries that feed through the cervical vertebrae. As a result, approximately 23% of the brain's oxygenated blood supply could be hampered, giving rise to the possibility of stroke or other neurological damage.

At the present time, customers must either endure the discomfort and risk the danger of vertebral arterial injury or do one of two things—support their heads with their hands or ask that a folded, ordinary towel be placed in the indentation to provide some degree of comfort and protection. My search revealed no prior art relative to the problem of safety, which my neck cushioning towel helps to solve. Likewise, my search revealed no prior art relative to the problem of discomfort, which my neck cushioning towel solves.

OBJECTS AND ADVANTAGES

Accordingly, besides the objects and advantages of the neck cushioning towel described in my above patent, several objects and advantages of the present invention are:

(a) to provide a neck cushioning towel that is an economical solution to the problem of discomfort;

(b) to provide a neck cushioning towel that is an economical aid in maintaining the head in a neutral position;

(c) to provide a neck cushioning towel with an easily removable sac that allows the towel to be washed in accordance with established health standards;

(d) to provide a neck cushioning towel that is color coordinated with the décor of the beauty salon, barber shop or the like.

Further objects and advantages are to provide a neck cushioning towel that is easy and convenient to use and is readily adjustable to fit any size person.

Further objects and advantages of my invention will become apparent from a consideration of the drawings and ensuing description.

BRIEF DESCRIPTION OF THE DRAWINGS

The accompanying drawings are submitted for the purpose of illustration only and are not intended to define the scope of the present invention.

REFERENCE NUMERALS IN DRAWINGS

| | | | |
|---|---|---|---|
| 10 | neck cushioning towel | 12 | pouch |
| 14 | hook strip of hook and pile fastener | 16 | pile strip of hook and pile fastener |
| 18 | hook strip of hook and pile fastener | 20 | towel |
| 22 | pile strip of hook and pile fastener | 24 | sac |
| 26 | gel | 28 | a head of hair |
| | | 30 | sink |

DESCRIPTION—FIGS. 1–3

Figure 1:
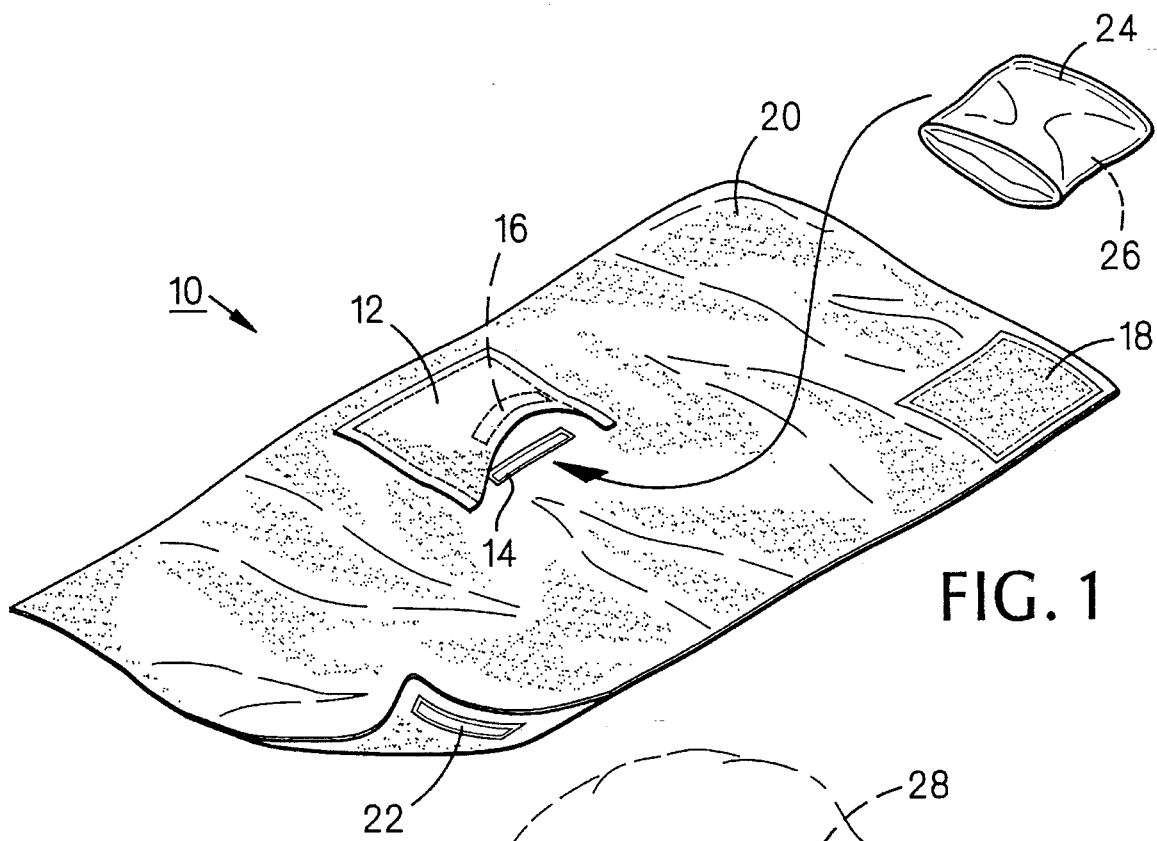
FIG. 1 shows an adjustable towel with a pouch and a removable sac.

A sample embodiment of a neck cushioning towel 10 of the present invention when it is not in use is illustrated in FIG. 1. A towel 20 has a pouch 12 centered along the upper edge with a hook and pile fastener 14 and 16. A hook fastener 18 is attached to the topside of towel 20's lower left edge. A pile fastener 22 is attached vertically to the underside of towel 20's lower right edge. However, the size, shape and location of hook and pile fastener 14 and 16 and hook and pile fastener 18 and 22 are variables and therefore not limited in size, shape or location to the embodiment of the present invention. A removable sac 24 filled with a gel 26 is shown before sac 24 is inserted into a pouch 12 and secured with hook and pile fastener 14 and 16. In the preferred embodiment, towel 20 and pouch 12 are a velvety soft, absorbant terry cloth material. However, towel 20 and pouch 12 can be partly terry cloth and partly a waterproof or water-repellent material or wholly a waterproof or water-repellent material, etc. Further, in the preferred embodiment, sac 24 is a durable plastic, such as a soft, pliable vinyl. Sac 24 is filled with gel 26 or the like and hermetically sealed. The size and shape of pouch 12 and sac 24 are variables and therefore not limited in size and shape to the embodiment of the present invention. The amount and consistency of gel 26 are variables and therefore not limited in amount and consistency to the embodiment of the present invention.

Figure 2:
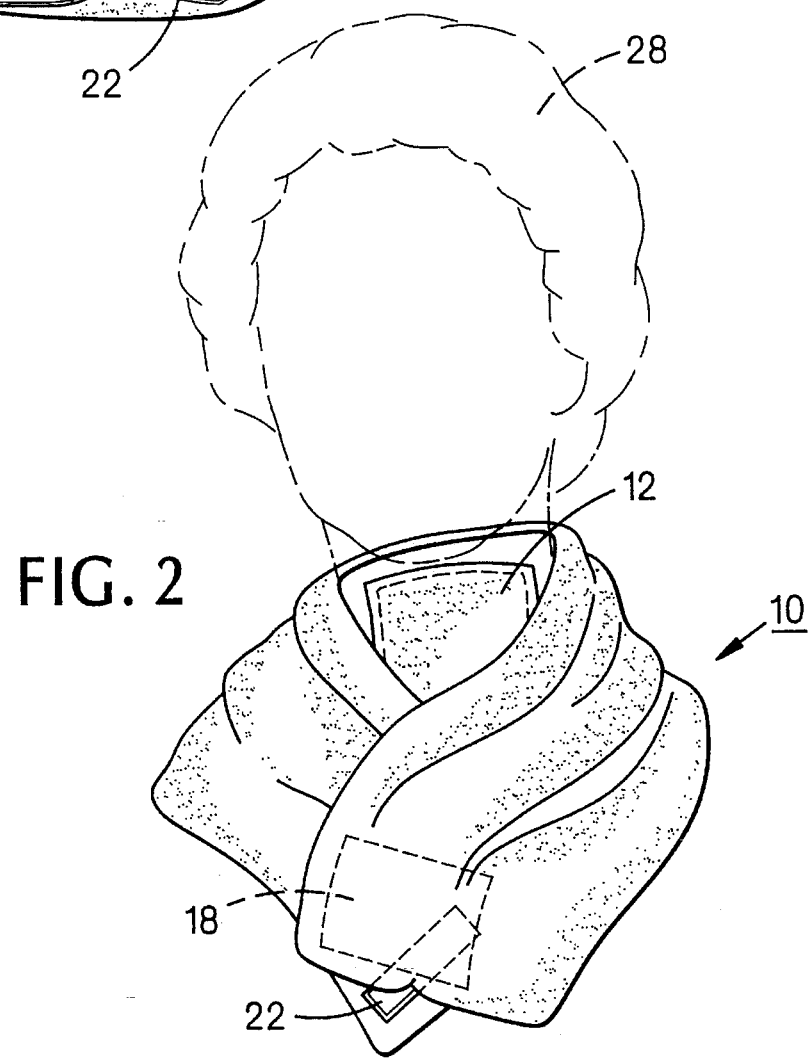
FIG. 2 shows a neck cushioning towel in place and the approximate location of the sac-filled pouch.

FIG. 2 shows neck cushioning towel 10 in place and the approximate location of the cushioning feature in relation to a head of hair 28 and the neck.

Figure 3:
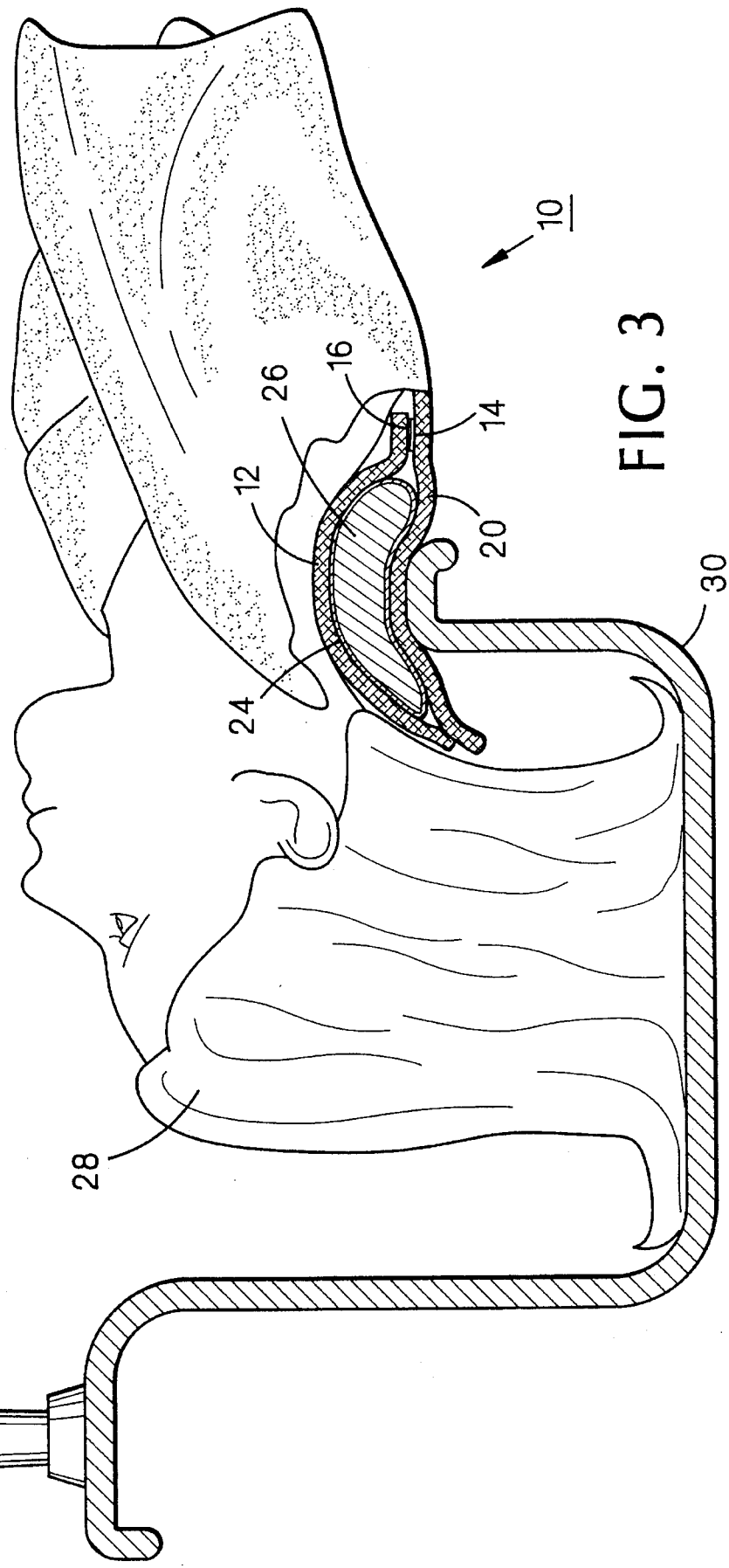
FIG. 3 shows a neck cushioning towel in use at a commercial sink.

FIG. 3 shows neck cushioning towel 10 in use at a sink 30. As pressure is applied to gel-filled sac 24, gel 26 displaces slightly in pouch 12. Sac 24 is held in place by hook and pile fastener 14 and 16. Neck cushioning towel 10 is held in place by a hook and pile fastener 18 and 22.

OPERATION FIGS. 2 AND 3

The manner of using the neck cushioning towel is similar to that for a towel in present use. Namely, the operator wraps a towel around the shoulders of the user as in FIG. 2. The novelty of the present invention is that when the user leans back and rests his/her neck against sink 30 as in FIG. 3, gel-filled sac 24 cushions the neck to provide comfort and helps to maintain the head in a neutral position, thereby reducing the risk of hyperextension or distortion of the vertebral arteries.

SUMMARY, RAMIFICATIONS AND SCOPE

Accordingly, the reader will see that the neck cushioning towel is easy and convenient to use, the reusable sac is easily and quickly removed, that the neck cushioning towel is an economical solution to the problem of discomfort, and its use will help to reduce the risk of vertebral arterial hyperextention or distortion. Furthermore, the neck cushioning towel has the additional advantages in that it serves a threefold purpose-absorption, comfort and protection;

it is durable;

it is hygienic;

the insertable sac is reusable it can be color coordinated with any décor it is adjustable Although the description above contains many specificities, these should not be construed as limiting the scope of the invention but as merely providing illustrations of some of the presently preferred embodiments of this invention. For example, the sac can be filled with air instead of a gel; the towel can have other shapes, such as elliptical, trapezoidal, etc.

Thus, the scope of the invention should be determined by the appended claims and their legal equivalents, rather than by the examples given.

I claims:

1. A neck cushioning towel for providing comfort for the cervical vertebral area of the neck and for helping to maintain the head in a neutral position to help reduce the risk of vertebral arterial injury, whereby a user's hair can be washed, rinsed or treated at a commercial sink designed with an uncushioned indentation where the cervical vertebral area of the neck rests, said neck cushioning towel comprising:
   (a) a substantially rectangular towel defining upper and lower edges connected by two side edges wherein the upper and lower edges have a length greater than the two side edges;
   (b) a pouch located approximately in the center of the length of said towel and positioned adjacent an upper edge;
   (c) a gel-filled, removable sac for insertion into the pouch;
   (d) fastening means for securing said sac in said pouch;
   (e) an adjustable means attached to the towel for an adjustable fastener fit of the towel around a human being.

2. The neck cushioning towel of claim 1 wherein the material of said towel is selected from the group consisting of an absorbant terry cloth material, partly terry cloth and partly a waterproof or water-repellant material, and wholly a waterproof or water-repellent material.

3. The neck cushioning towel of claim 1 wherein said sac is hermetically sealed.

4. The neck cushioning towel of claim 1 wherein said pouch is sized to secure said sac in said pouch.

5. The neck cushioning towel of claim 1 wherein said sac is sized for insertion into said pouch.

6. The neck cushioning towel of claim 1 wherein said fastening means comprises a hook and pile fastener.

7. The neck cushioning towel of claim 1 wherein said adjustable fastener means comprises a hook and pile fastener.

* * * * *

UNITED STATES PATENT AND TRADEMARK OFFICE
CERTIFICATE OF CORRECTION

PATENT NO. : 5,587,219

DATED : December 24, 1996

INVENTOR(S) : Lois E. Schofield

It is certified that error appears in the above-identified patent and that said Letters Patent is hereby corrected as shown below:

Column 3, line 9, change "-" to -- -- --.
Column 3, line 28, change "claims" to --claim--.
Column 4, line 13, change "adjustable means" to --adjustable fastener means--.
Column 4, line 14, change "adjustable fastener fit" to --adjustable fit--.
Column 4, line 18, change "water-repellant" to --water-repellent--.

Signed and Sealed this

Twenty-fifth Day of February, 1997

Attest:

BRUCE LEHMAN

*Attesting Officer*  *Commissioner of Patents and Trademarks*